United States Patent [19]

Krus

[11] 4,172,611
[45] Oct. 30, 1979

[54] ADJUSTABLE SUPPORT FOR AUTO TAG HOLDING LID

[76] Inventor: Joseph W. Krus, 1301 NE. Miami Gardens Dr., North Miami Beach, Fla. 33179

[21] Appl. No.: 914,603

[22] Filed: Jun. 12, 1978

[51] Int. Cl.² .............................................. B62D 25/00
[52] U.S. Cl. ............................ 296/1 C; 292/DIG. 15
[58] Field of Search .................. 296/1 C; 292/DIG. 15

[56] References Cited
U.S. PATENT DOCUMENTS

| | | | |
|---|---|---|---|
| 1,631,979 | 6/1927 | Piccirilli | 292/DIG. 15 |
| 2,898,140 | 8/1959 | Gislason | 292/DIG. 15 |
| 3,809,419 | 5/1974 | Chezem | 292/DIG. 15 |
| 3,905,637 | 9/1975 | Smith | 296/1 C |
| 3,912,322 | 10/1975 | Weaver | 296/1 C |

*Primary Examiner*—Philip Goodman
*Attorney, Agent, or Firm*—Salvatore G. Militana

[57] ABSTRACT

A support for holding an auto tag lid in an adjustably open position for access to the gasoline filler tube consisting of a rod having a link swivelly connected thereto, the link having a loop for being secured to a bolt that fastens the license tag to the lid and the rod having a pliable cup member mounted on its free end for engaging the body of the auto.

1 Claim, 6 Drawing Figures

U.S. Patent    Oct. 30, 1979    4,172,611
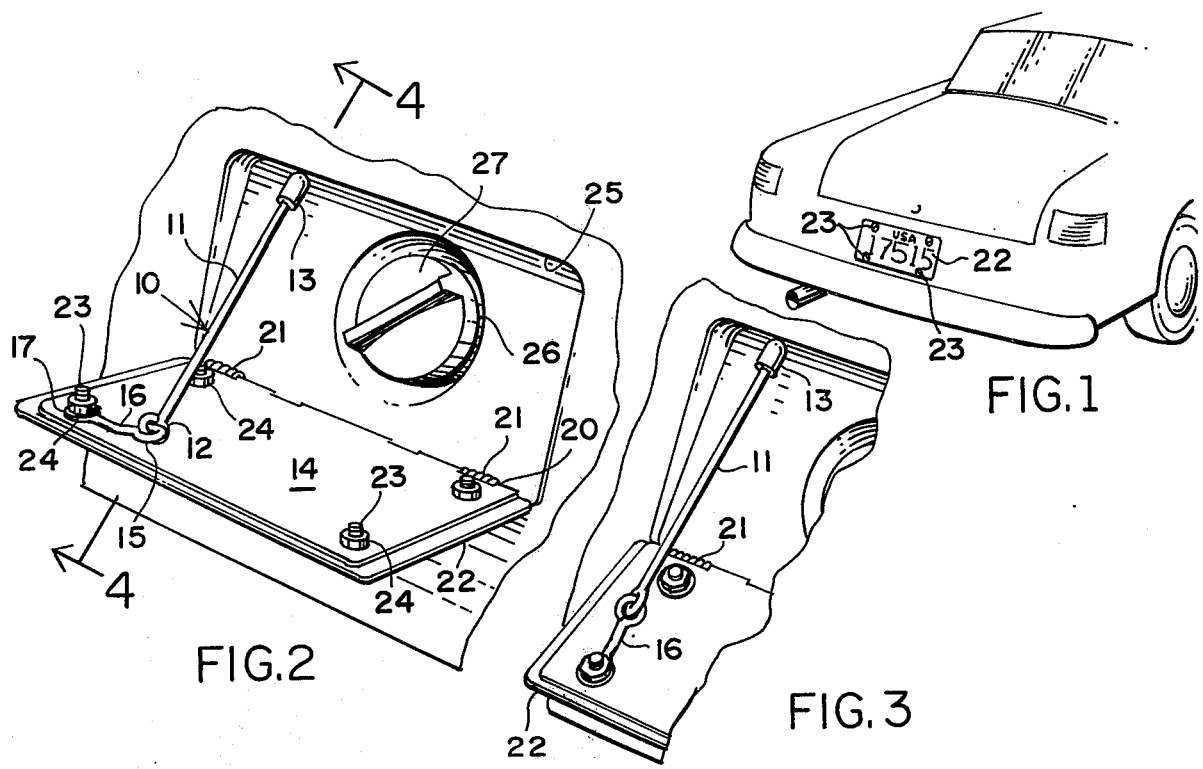
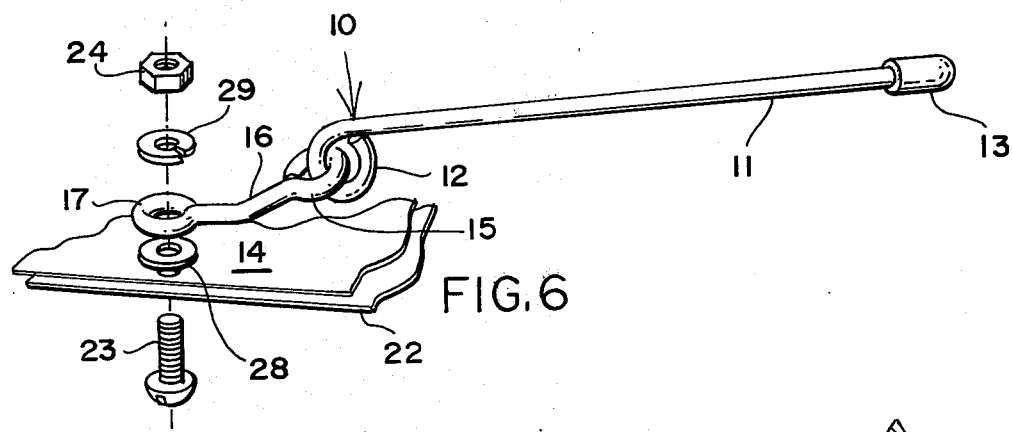
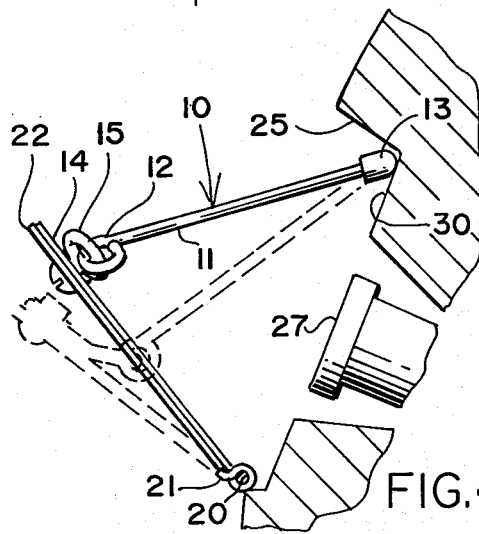
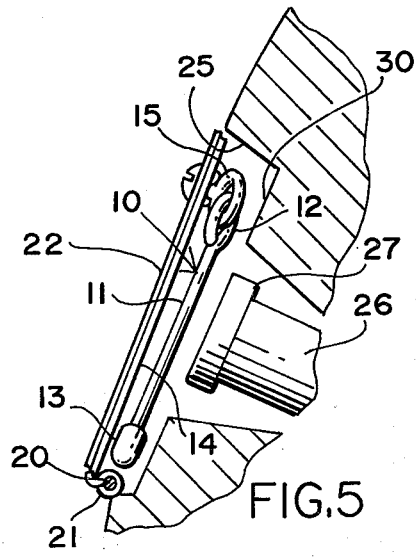

ADJUSTABLE SUPPORT FOR AUTO TAG HOLDING LID

BACKGROUND OF THE INVENTION

1. Field of the Invention

This invention relates to a hinged lid support and is more particularly directed to an adjustable support for holding an auto license tag holding lid in an open position.

2. Description of the Prior Art

At the present time there are both straight rod-like props and hinged brackets for holding a hinged lid in an open position. There is no conventional device for holding a license tag holding lid in an open position in order to provide access to the gasoline tank filler tube. At present a person has to hold this lid with one hand since the lid is under the influence of a spring to return to a closed position while he holds a gasoline spout in the other hand in order to replenish the gasoline in the tank; or he places an object between the opened lid and its support to prevent the lid from closing. The present invention contemplates a device which is adjustable in its effective length, is secured to the lid and holds the lid in an open position allowing the operator to have both hands free to remove the gasoline tank cap and fill the tank with gasoline.

SUMMARY OF THE INVENTION

Therefore a principal object of the present invention is to provide a support for holding open an auto tag holding lid, which support is secured to the license bolt, is readily extended to maintain the lid in an open position and is housed completely within the confines of the lid chamber when the lid is in the closed position.

Another object of the present invention is to provide a support for an auto tag holding lid that is effectively adjustable in length to fit the various models of autos.

A further object of the present invention is to provide a support for an auto tag holding lid that is simple in construction in operating position by means of the license retaining screw or bolt and is readily swung into position to support the lid in its open position.

With these and other objects in view, the invention will be best understood from a consideration of the following detailed description taken in connection with the accompanying drawing forming a part of this disclosure, with the understanding, however, that the invention is not confined to any strict conformity with the showing of the drawing but may be changed or modified so long as such changes or modifications mark no material departure from the salient features of the invention as expressed in the appended claims.

BRIEF DESCRIPTION OF THE DRAWING

In the drawing:

FIG. 1 is a fragmentary perpsective view of an automobile showing the license plate holding lid in a closed position.

FIG. 2 is a similar view of the license plate holding lid shown in an open position with the support device positioned for the minimum opening of the lid.

FIG. 3 is a similar view showing the support device positioned for the maximum opening of the lid.

FIG. 4 is a cross sectional view taken along the line 4—4 of FIG. 2, the dotted lines showing the position of the lid at its maximum opening.

FIG. 5 is a similar view showing the lid in its closed position.

FIG. 6 is an exploded view thereof.

DESCRIPTION OF THE PREFERRED EMBODIMENT

Referring to the drawing wherein like numerals are used to designate similar parts throughout the several views, the numeral 10 refers to a support for an auto tag holding lid 14 constructed in accordance with my invention consisting an elongated rod 11 having a loop or eyelet 12 at one end and a pliable cup member 13 telescopically mounted at the other end. The loop 12 is engaged by a similar loop 15 positioned at one end of a link 16 at whose other end is a further loop 17.

The lid 14 which is hinged at 20 is provided with coil springs 21 at the hinge means 20 to yieldingly maintain the lid 14 in a closed position. The hinged lid 14 encloses a chamber 25 in which there is a filler tube 26 having a closure cap 27. The lid 14 permits access to the cap 27 and filler tube 26 when it is desired to replenish the gasoline in the tank of the auto.

Mounted on the outside surface of the lid 14 is a license plate 22 secured thereto by a bolt 23 and nut 24 at each corner thereof. At one of the bolts 23 forming a post, the loop 17 is mounted thereon having a flat washer 28 interposed between the loop 17 and the lid 14 and a lock washer 29 interposed between the loop 29 and the nut 24. With this arrangement of fastening the various parts, the link 16 can be secured against movement when placed in any desired position as is explained hereinafter. The arm or rod 11 either lies along the lid 14 when in a closed position as shown by FIG. 5 or extends upwardly to cause the pliable cup member 13 to engage the wall 30 of the chamber 25 as shown by FIGS. 2 and 3 when the lid 14 is in its open position.

The adjustable characteristic of my device 10 is effected by the selective positioning of the link 16 with relation to the lid 14. As shown by FIG. 2, if the link 16 is secured on the bolt 23 in parallel relation with the top edge of the lid 14, then the lid 14 can be swung to its open position that is minimal for the device 10. If the link 16 is pivoted about the bolt 23 to become parallel to the side edge of the lid 14, the lid 14 can then be swung open to the maximum opening permitted by my device 10. With the link positioned between the two aforementioned positions, the amount of the opening of the lid 14 will be accordingly varied.

What I claim as new and desire to secure by Letters Patent is:

1. A combined support for an auto tag holding lid and a license plate comprising a substantially flat member hinged along one edge to an automobile body, a license plate mounted on said flat member, an elongated body member, a substantially short link member interengaging loops mounted at one end of said body member and at one end of said link member, a pliable member mounted at the other end of said elongated body member and a third loop mounted on the other end of said link member, bolt means fastening said license plate to said lid along the other edge of said flat member and said loop secured to said bolt means for fastening said link member to said lid.

* * * * *